United States Patent Office 3,784,716
Patented Jan. 8, 1974

3,784,716
CEREALS CONTAINING DISCRETE NUTRIENT PARTICLES ON THE SURFACE
Herbert D. Spangler, Philadelphia, Pa., assignor to Merck & Co., Inc., Rahway, N.J.
No Drawing. Filed Jan. 28, 1970, Ser. No. 6,577
Int. Cl. A23l 1/30
U.S. Cl. 426—289                                    2 Claims

ABSTRACT OF THE DISCLOSURE

Cereals are dry coated with a coating composition containing nutrient particles precoated with a fatty acid, the coating composition having been applied when the cereal and the coating composition are at a temperature at which said fatty acid is tacky.

---

This invention is related to the nutrient coating of dry edible cereals and particularly to a composition which contains a high percentage of vitamins and minerals and which will adhere to the cereal flakes, grains or shreads.

The cereals to which the invention are to be applied are represented, for example, by the ordinary corn flakes, puffed oat grains, and wheat shreds including shredded wheat biscuits. These flakes, puffed grains and shreads are found in a variety of shapes, sizes and grain substances on the grocers' shelves and the invention may be applied to any of them. These edible products may be consumed dry but ordinarily they are eaten after milk or other dairy product is combined with them. The invention therefore has a wide application to these known cereal products.

The nutrient-containing coating composition of the invention possesses the feature that it can readily be applied to the cereals and firmly adheres thereto. The invention satisfies the heretofore recognized need for a powdered preparation in which the vitamins are uniformly distributed and which can be dusted on the cereals to uniformly coat them. The uniformity of the coating on all cereal particles is especially important as the equality of weight maintains a uniformity of distribution in the package. This eliminates the tendency, experienced in the past, for heavier coated particles to settle. The dry, powdered nature of the coating composition eliminates the need for a solvent containing the nutrients and which would have to be evaporated or otherwise removed after being applied to the cereals. Water, as a solvent would be an especial problem with puffed cereal grains because the puffed grain would collapse; the anhydrous nature of the present coating composition is one of its distinct features.

Another advantage of this invention is that the ingredients are readily available commercially and consequently no new vitamin or mineral preparation is required. Moreover, the intermixing of the ingredients is readily carried out with commercially available apparatus. These may be the familiar blending and milling machines which are utilized by workers in this art. Also, the actual application of the coating composition to the cereal particles is carried out with conventional apparatus.

The discovery which is the basis for this invention is that vitamin and mineral particles which are now being supplied with a coating to preserve them or mask their taste becomes tacky when they are heated. This tackiness causes them to adhere to the cereals on which they are dusted if the cereals are at about the same temperature. The coating is a hard fatty acid such as commercial stearic acid; vitamin $B_1$, $B_2$, niacinamide and $B_6$ and minerals having this coating are sold under the trademark Mercote by Merck and Co. Inc. These coatings are disclosed in Patents 3,035,985 and 3,037,911 and their teachings are hereby incorporated in this specification by this reference.

At a temperature between 30–70° C., depending on the particular coating material it becomes tacky or sticky. These coated nutrient particles are mixed with ingredients which do not become tacky at this temperature and the coated particles should constitute from 15 to 30% and preferably 20 to 25% of the total mixture weight as within this range the particles will not stick together but the entire mixture will adhere to the preheated cereal. The other ingredients which do not possess this tacky coating may be vitamins such as A, C, D, and $B_{12}$ and these uncoated vitamins may constitute from zero up to about 25% of the total weight. The remainder of the mixture, which serves to prevent the coated particles from sticking together is corn or other starch and it should amount to at least 50 to 60% of the total weight. Unexpectedly, in this mixture the particles will not adhere together when heated to a tacky temperature but they will adhere to preheated, dry cereal flakes, grains, shreds, etc.

To carry out the invention, the ingredients are first intimately combined preferably using a blend-mill-blend procedure. As an important feature of the invention this resulting composition is heated to its softening point and this generally is within the 30–70° C. range. At this temperature the particles will be slightly tacky but they will remain discrete from each other and not combine and consequently the powdery consistency is maintained. The cereal also is heated to approximately this same temperature in a conventional jacketed rotating coating pan so that the temperature of its contents can be adjusted and maintained. The preheated nutrient mixture is then dusted on the heated cereal to obtain a uniform distribution. This dusting operation is carried on in a manner similar to the sugar coating of pharmaceutical tablets in that the worker observes the rate of adherence to the cereals and makes sure the powder is added at about the rate that it adheres to the cereal. Care must be observed to not add the powder faster than this rate because it may cause adherence of the cereals to each other.

After a sufficient amount of coating composition is added the heat supply to the jacket is stopped, and while rotation is continued, the cereal is allowed to cool to room temperature. The amount of nutrient coating to be added may be up to or slightly above that which will supply the daily intake of the nutrients to a person consuming an average serving of the cereal.

A representative example of the vitamin composition is:

EXAMPLE 1

| Ingredient: | Gms. |
|---|---|
| Vitamin A, 60/120 mesh | 18.1 |
| Vitamin D, 60/120 | 1.8 |
| Vitamin $B_1$, Mercote (33⅓%)* | 7.3 |
| Niacinamide, Mercote (33⅓%) | 11.4 |
| Niacinamide, Mercote (33⅓%) | 70.1 |
| Vitamin $B_6$, Mercote (33⅓%) | 14.3 |
| Vitamin C | 85.0 |
| Vitamin $B_{12}$, Stabicote (1%)** | 0.5 |
| Starch, corn U.S.P. Powd. | 245.1 |
| | 453.6 |

*This percent describes the vitamin activity by weight in the commercial product but the percent content may be higher or lower if it is within the teachings of the coatings in the above-mentioned Patents 3,035,985 and 3,037,911.
**This is a spray-dried, gelatin coated product sold by Merck and Co. Inc. and is described in Patent 3,035,982 which is incorporated herein by reference. Any other stabilized commercial product may be substituted such as that of Patent 2,830,933 which is incorporated herein by reference.

EXAMPLE 2

One or more of the Mercote vitamins in Example 1 may be increased, reduced or omitted to the extent that the total weight of the remaining Mercote products remains within the range of 15 to 30% of the total weight of the mixture. Thus if in Example 1 the vitamin $B_6$ is altogether omitted, the amount of starch could be within the range of from 100 to 400 grams, but preferably 160 to 250 grams.

EXAMPLE 3

The vitamin A, D, C and $B_{12}$ may be increased, reduced or omitted, and be replaced by the amount of starch needed to maintain the Mercote products as 15 to 30% of the total weight of the mixture. Thus if vitamin C is omitted in Example 1, it would be replaced with from 220 to 560 grams of starch, and preferably 290 to 390 grams.

EXAMPLE 4

The ingredients of Example 1 are combined, except that the amount of starch is reduced to as low as 140 grams or increased to as high as 475 grams preferably 200 to 300.

EXAMPLE 5

Ferrous sulfate is added to any one of the above compositions and a corresponding amount by weight of starch is removed. Or, any other mineral or accepted nutrient substance may be added to the composition, a corresponding adjustment being made in the weight of starch.

EXAMPLE 6

Any one of the above coating compositions may be applied to commercial corn flakes as follows:

The ingredients are combined, then blended, then milled and then reblended. These are conventional operations which are now being employed in this art and they are carried out to assure an absolutely uniform mixture. The operation may be carried out in known ribbon blenders, Hobart mixers, Glenn mixers, Fitzpatrick communitors, micropulversizers, ball mills, hammer mills or any other apparatus known to thoroughly blend and mix such powdered or granular ingredients.

After it is assured that an absolutely complete intermix is obtained, the mixture is heated to 30–70° C. preferably in a jacketed container, and preferably while in motion as in a tumbling barrel or drum or in a rotating coating pan such as is used in the sugar coating of pharmaceutical tablets. At the same time the corn flakes are heated to a temperature in the same range utilizing a jacketed rotating coating pan, for instance. Then, while the tumbling is continued, the coating mixture is dusted on the corn flakes, care being taken to not exceed the rate of addition at which the flakes tend to stick together.

As about 0.2 gram of the mixture of Example 1 provides the minimum daily requirement for these vitamins, this amount, if applied to one pound of the corn flakes would provide a cereal such that a five- to six-ounce serving would provide one-third of the minimum daily requirement. With this as a basis it is apparent that up to about 0.6 gram of the mixture can be applied to each pound of cereal. Because of the excellent adhering nature of the composition, it may be applied at any rate per minute below that which will cause the adherence of individual corn flakes.

When the desired amount of coating has been added, the heating is terminated and while the tumbling operation is continued the coated flakes are allowed to cool to room temperature or, at least, to a temperature below that at which the flakes are tacky or sticky. Cooling air may of course be supplied to assist this. Then the product may be packaged.

EXAMPLE 7

Any other kind of cereal may be substituted in Example 6. This may be wheat, oat or combinations of cereal grains, or other flakes. Or it may be in the form of puffed grains, or shreds, or the shredde biscuit form. The coating may be applied in either a batch or a continuous operation. The coating material may be applied by hand or by a feeder such as a speed regulatable belt.

What is claimed is:

1. A process of fortifying a cereal with a nutrient which comprises bonding discrete particles to said cereal heated to a temperature of 30–70° C., said discrete particles comprising said nutrient enclosed in an envelope coating of a fatty acid, said fatty acid having the property of becoming sticky or tacky at 30–70° C., said bonding being carried out by having said envelope coating tacky or sticky when in contact with said cereal.

2. The process according to claim 1 in which said nutrient is selected from the group consisting of vitamins $B_1$, $B_2$, $B_6$, niacinamide and a nutritional edible iron composition.

References Cited

UNITED STATES PATENTS

| | | | |
|---|---|---|---|
| 2,685,517 | 8/1954 | Dunmire | 99—11 |
| 3,037,911 | 6/1962 | Stoyle et al. | 99—11 |
| 2,829,054 | 4/1958 | Feinstone | 99—11 |

RAYMOND N. JONES, Primary Examiner

R. M. ELLIOTT, Assistant Examiner

U.S. Cl. X.R.

426—367, 311